Nov. 14, 1944.　　　A. K. McLEOD　　　2,362,913
ADJUSTABLE PITCH PROPELLER
Filed May 11, 1939　　　4 Sheets-Sheet 1
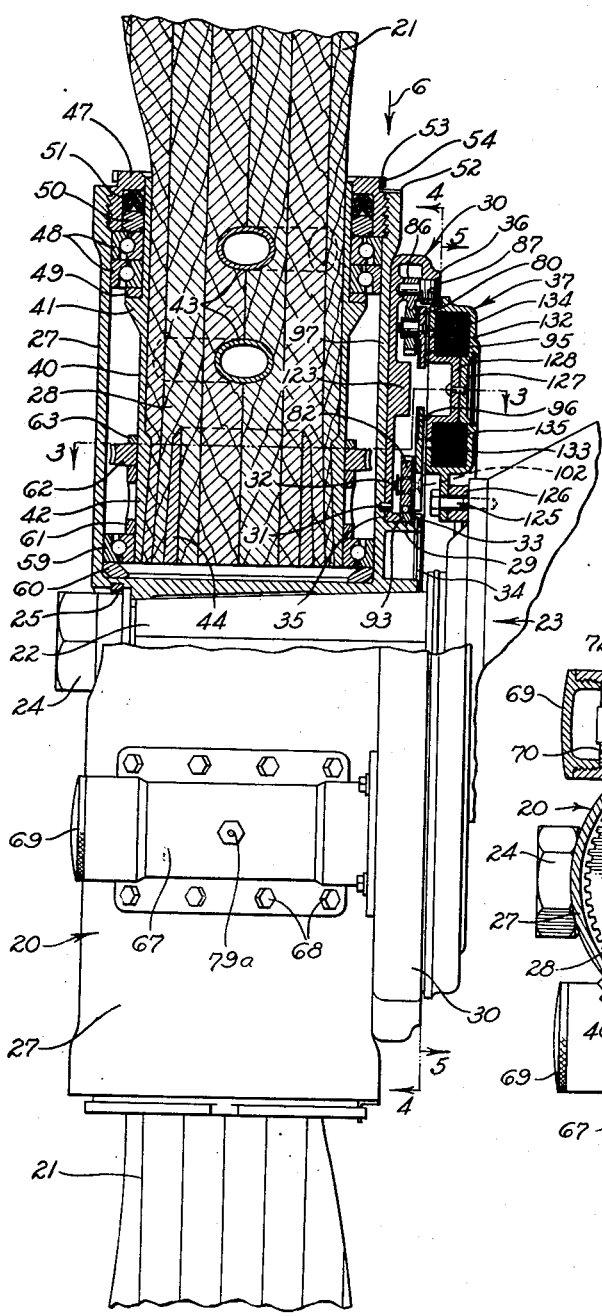
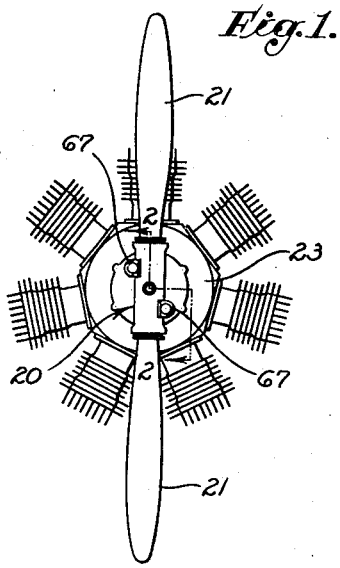
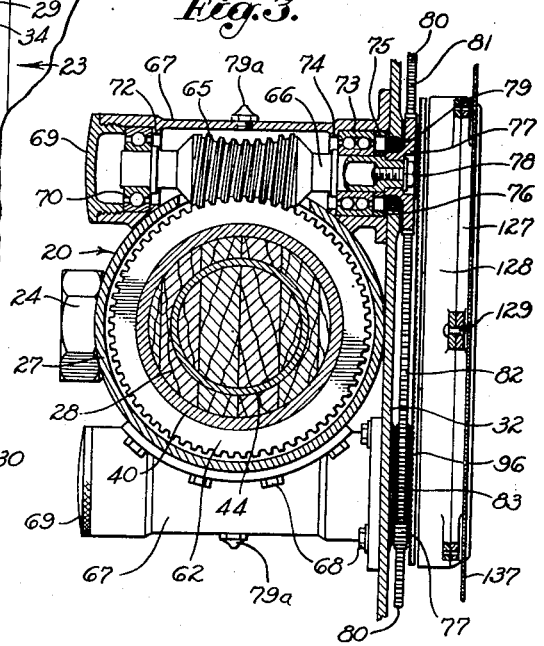
INVENTOR
ALBERT K. McLEOD
BY
HARRIS, KIECH, FOSTER & HARRIS
FOR THE FIRM
ATTORNEYS Nov. 14, 1944.   A. K. McLEOD   2,362,913
ADJUSTABLE PITCH PROPELLER
Filed May 11, 1939   4 Sheets-Sheet 2

INVENTOR,
ALBERT K. McLEOD
BY
HARRIS, KIECH, FOSTER & HARRIS
FOR THE FIRM
ATTORNEYS

Nov. 14, 1944.  A. K. McLEOD  2,362,913
ADJUSTABLE PITCH PROPELLER
Filed May 11, 1939  4 Sheets-Sheet 3
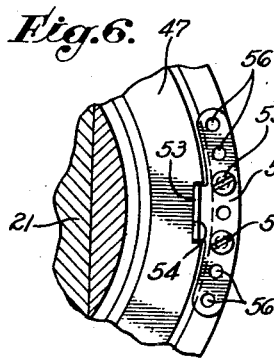
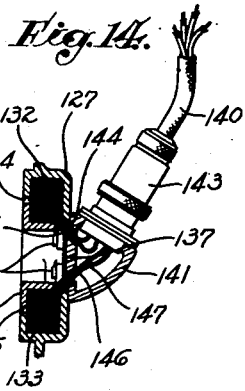
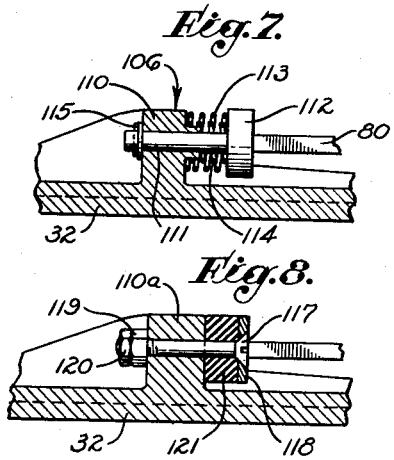
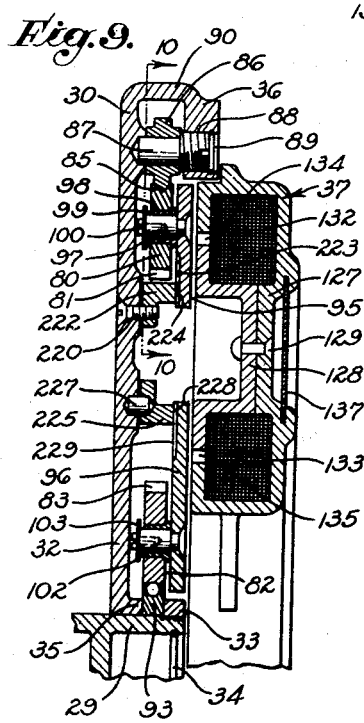
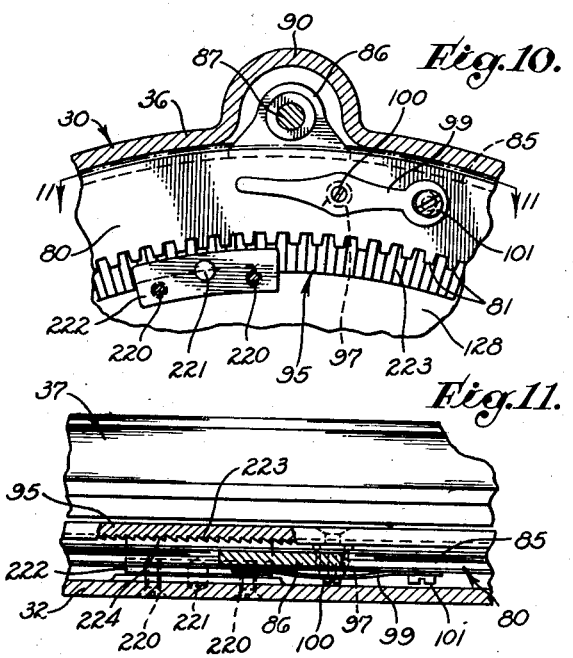
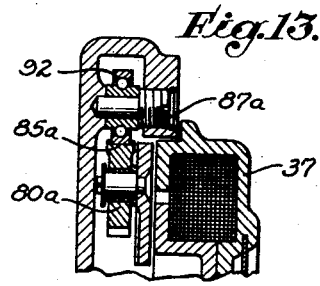
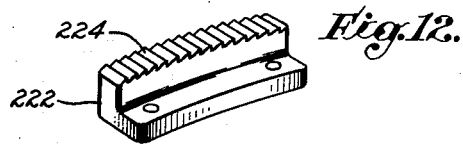
INVENTOR
ALBERT K. McLEOD
BY HARRIS, KIECH, FOSTER & HARRIS
FOR THE FIRM
ATTORNEYS

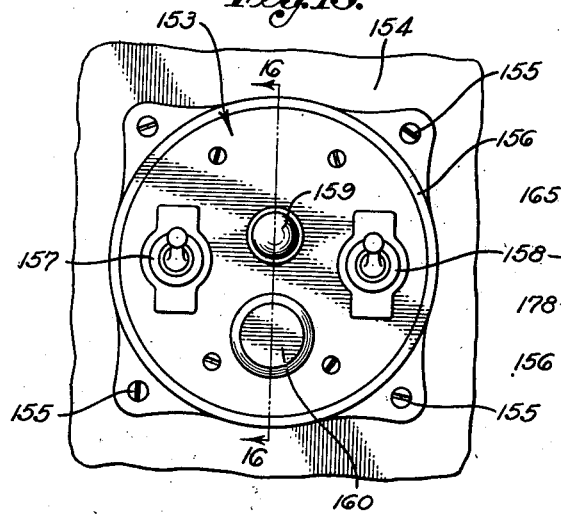

Patented Nov. 14, 1944

2,362,913

UNITED STATES PATENT OFFICE 2,362,913

ADJUSTABLE PITCH PROPELLER

Albert K. McLeod, Los Angeles, Calif., assignor to Aviation Patents, Inc., Los Angeles, Calif., a corporation of California Application May 11, 1939, Serial No. 273,021
In Great Britain May 13, 1938

16 Claims. (Cl. 170—163)

My invention relates to means for controlling the position of a member that is movably or adjustably mounted on a rotary body, such control being effective during relatively rapid rotation of the body. While my invention as thus defined is to be understood as applicable to various arts and devices, it has numerous inherent advantages that have led to its immediate application to aircraft mechanics, with particular reference to the problem of controlling the pitch of variable pitch propellers during flight. The principles of my invention may best be approached and best conveyed to those skilled in the various arts by confining my present disclosure to the construction of an adjustable propeller, but such an embodiment of my invention is presented as illustrative only.

The desirability of adequate control over the pitch of propeller blades in the course of propeller operation has been long recognized. A relatively small pitch angle is optimum at takeoff to develop and absorb all the power available to accelerate the aircraft to flight speed in a limited time interval. A somewhat greater pitch angle is required for climbing effectively to the cruising altitude after takeoff, and once the cruising altitude is attained, a still further increase in the pitch angle of the propeller blade is required for efficient and economical operation. Generally, maximum cruising economy is attained when the motor is running at 70% of its horsepower capacity, an operating condition that is readily obtained if the pilot has adequate control over propeller pitch. Under certain circumstances, it may be of vital importance to be able to adjust the pitch of each propeller blade to a "feathering" point to minimize the retarding effect of the propeller blades following engine failure, especially in aircraft having multiple propellers. When an aircraft is being landed, and occasionally under other operating conditions, negative pitch on the part of the propeller blades may be highly desirable, whereby the available power may be employed to decelerate the aircraft.

The fact that exceedingly difficult problems are met in any attempt to develop a successful adjustable pitch propeller is attested by the state of the art prior to my invention. No commercially accepted propeller that has an adjustment range extending to reverse pitch or even to the feathering point will operate with the rapidity required in actual practice. All of the propellers now on the market are relatively expensive to manufacture and relatively heavy. They are complicated, difficult to install, and their parts are inaccessible for inspection, servicing, and replacement after installation. All of the propellers consume considerable power for pitch changes.

As related to the construction of airplane propellers, the general object of my invention is to meet the need for an efficient adjustable pitch propeller that is so apparent in the above statement of the prior art.

With reference to the performance of such a propeller, it is my object to provide a variable pitch control that is operative in the course of flight, that has a range extending from zero pitch beyond full feathering to effective reverse pitch, that is fully flexible within that range in the sense that the propeller blades may be adjusted with precision to any position desired, that accomplishes pitch changes substantially instantaneously, requires relatively little power for operation, and, finally, maintains any given pitch to which the blades may be adjusted.

Other objects of my invention as applied to aircraft propellers relate to the construction of the control mechanism. It is my purpose to achieve a simple and inexpensive adjustable control propeller of relatively low weight. It is my object to provide a structure that may be readily installed on aircraft and in which the constituent parts are readily accessible after installation for inspection, servicing, and replacement.

The underlying problem of governing, during the rotation of a rotary member, the position of a member adjustably mounted thereon is exceedingly difficult where, as in a variable pitch propeller, it is required that the adjustment movement be relatively slow or relatively limited in extent and yet be accomplished while the rotary member that carries the adjustable member is rotating at a relatively high angular velocity. The difficulty may be readily appreciated when it is noted that a successful mechanism must be operative to effect a pitch change of only two or three degrees while the propeller shaft is rotating at 2000 or more R. P. M. As applied to such high angular velocities, my invention is characterized by the conception of mounting on the rotary member a means to rotate bodily therewith, and of providing means to merely retard such bodily movement of the first means relative to rotation of the rotary member, thereby to shift the adjustable member that is mounted on the rotary member. It is to be emphasized that, in contrast to prior art patentees, I studiously avoid any immobilization of the means on the rotary member that controls the adjustable member. In fact, one of the most difficult objects to attain in the development of my invention has been that of providing a control means that is effective and yet does not retard too severely the rotation of the mechanism that is carried by the propeller shaft.

The character of control essential for rapid but smooth changes in blade pitch requires correlation between the effective strength and the duration of the retardation force, regardless of how that force is generated or applied, and an important object of my invention is to provide such correlation. Within a limited range, the strength of the force may be increased if the duration is decreased, and vice versa. A retardation force may be too severe for even momentary application and a mild force satisfactory for momentary duration may wreck the pitch-changing mechanism if applied continuously for as long as three or four seconds. I have discovered, however, that the required correlation may be had by using only light or very moderate force limited to only momentary duration, the momentary applications of force being repeated as many times as necessary for a desired extent of pitch change.

In the preferred practice of my invention, retardation of the rotating mechanism with respect to the rotation of the propeller shaft is accomplished by friction electromagnetically actuated, and one of my objects is to provide an electromagnet construction suitable for this purpose. Electromagnetic means have not been successful up to now for generating retardation friction in propeller-pitch control because, in the first place, the necessity for the above-discussed correlation has not been heretofore appreciated in this art, and because, in the second place, no electromagnetic means heretofore employed for such purpose has been operable for producing moderate retardation force nor operable for rapid intermittent action.

The factors contributing to the proper correlation of strength and duration of the retarding force in the preferred practice of my invention are: first, the employment of relatively smooth coacting friction surfaces to achieve moderation of retardation effect; second, the employment of an electromagnetic means that acts with only moderate force; third, the employment of an electromagnetic means that requires so little current that the energizing circuit may readily be closed and opened a number of times in rapid succession, whereby the retarding force may be applied in impulses of only momentary duration; and, fourth, the employment of means to yieldingly resist the relative movement of coacting friction surfaces that is produced by the electromagnetic means, whereby the frictional contact is further moderated and whereby the durations of such frictional contact are even less than the durations of the corresponding current impulses. A specific object of my invention is to balance the above factors for such correlation, but it will be apparent that all of the factors need not be present in all embodiments of my invention and, further, that the factors may be given varied emphasis in the various practices of the invention.

One group of objects in mind relates to the control mechanism that rotates with the propeller shaft. I seek in such mechanism efficiency, dynamic balance, irreversibility of gear trains, effective lubrication, lightness, and, finally, compactness without weakening of the propeller hub assembly.

That I have attained all of the objects set forth above is shown by the fact that my propeller, constructed substantially as set forth herein, has been tested by United States Government authorities and granted an approved type certificate. It provides a wide pitch range, rapid pitch changes and will operate on a conventional twelve-volt battery. It is so light and so inexpensive in construction that it is the first approved pilot controlled adjustable propeller commercially available for aircraft of under 150 horsepower rating.

In the drawings:

Fig. 1 is a front view of a two-blade propeller assembly incorporating my invention;

Fig. 2 is a greatly enlarged fragmentary view taken partly in section, as indicated by the broken line 2—2 of Fig. 1;

Fig. 3 is a transverse section through a portion of the hub, taken as indicated by the broken line 3—3 of Fig. 2;

Fig. 6 is a fragmentary view, taken as indicated by the arrow 6 in Fig. 2, showing the construction of a thrust nut lock;

Fig. 7 is a fragmentary section, taken as indicated by the line 7—7 of Fig. 4 to show the construction of a shock-absorbing gear stop;

Fig. 8 is a similar view to indicate an alternate construction for such a shock-absorbing gear stop;

Fig. 9 is a fragmentary section on an enlarged scale, taken along the broken line 9—9 of Fig. 4;

Fig. 10 is a fragmentary section, taken as indicated by the line 10—10 of Fig. 9;

Fig. 11 is a fragmentary section, taken as indicated by the line 11—11 of Fig. 10;

Fig. 12 is a perspective view of a latch member shown in Figs. 9, 10, and 11;

Fig. 13 is a fragmentary section similar to Fig. 9 to show an alternate means for rotatably mounting a gear of the mechanism;

Fig. 14 is a fragmentary section, taken along the line 14—14 of Fig. 5;

Fig. 15 is a front view of a device that may be mounted on the instrument panel for the control of my propeller;

Fig. 16 is a medial section of the device, taken as indicated by the line 16—16 of Fig. 15;

Fig. 17 is a transverse section, taken by the line 17—17 of Fig. 16;

Fig. 18 is a wiring diagram of the circuit associated with the control device of Figs. 15 to 17;

Fig. 19 is a second wiring diagram showing another arrangement that may be employed in my invention; and Fig. 20 is a cross-section of a propeller shank showing how, in one practice of my invention, a counterweight may be employed to balance a propeller blade.

Figure 4:
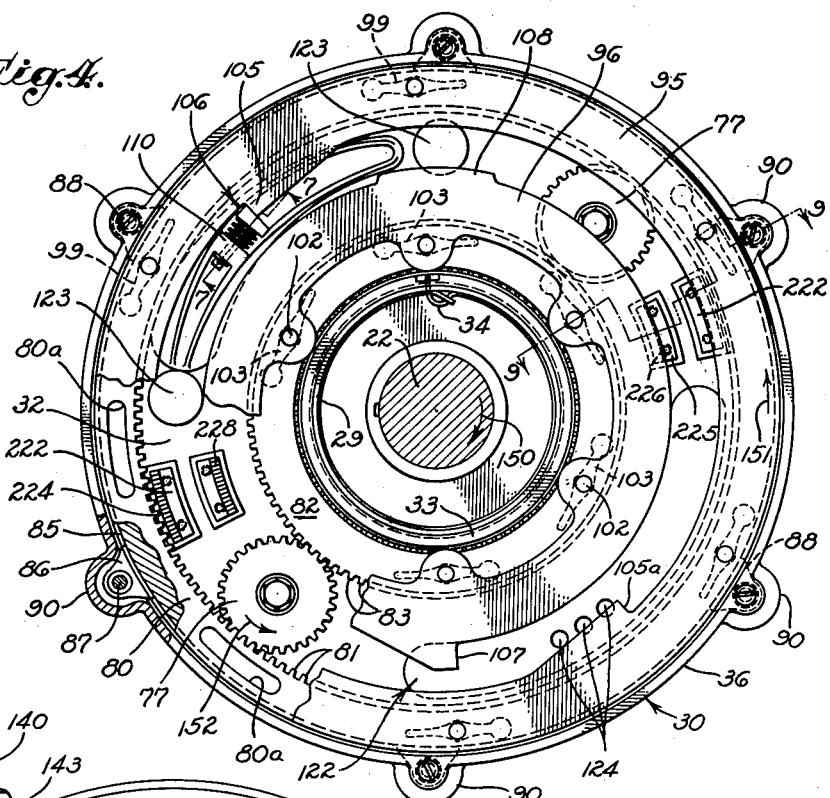
Fig. 4 is a transverse section through the hub, taken substantially as indicated by the line 4—4 of Fig. 2.
Figure 5:
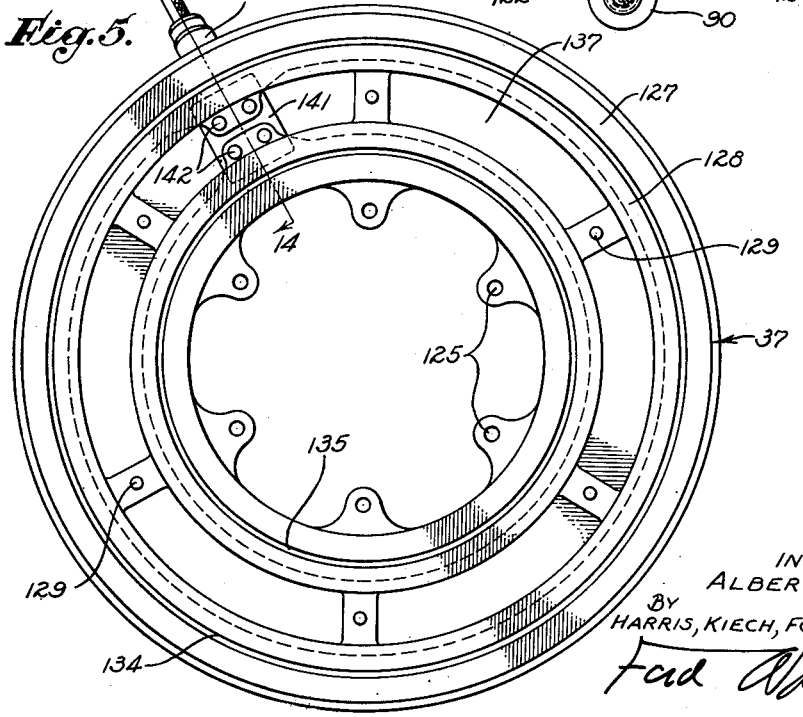
Fig. 5 is a similar section facing the opposite direction, as indicated by the line 5—5 of Fig. 2.

As heretofore stated, the problem to which my invention is directed is that of controlling the position of a member that is adjustably or movably mounted on a rotary member in a manner to permit changing the position or adjustment of the adjustable member at will while the rotary member is rotating. In the particular embodiment of my invention shown in detail in the accompanying drawings, the rotary body is whatever carries the variable pitch propellers, namely a hub body or hub assembly, generally designated by the numeral 20, and the adjustable members are the propeller blades, there being, for example, two such propeller blades 21 adjustably carried by the hub body, as indicated in Fig. 1. The hub body is mounted on a shaft 22 extending forward from an engine 23 in any suitable manner. For example, the hub body may be keyed onto a conical portion of the shaft, as indicated in Fig. 2, and secured thereon by a suitable nut 24 and pull ring 25. The hub body 20 may be of any construction adaptable to the function of adjustably carrying the propeller blades. In the particular construction herein used to illustrate the principles of my invention, the hub body has two radially disposed cylindrical portions or blade housings 27 adapted to receive the shanks 28 of the two propeller blades 21.

The mechanism employed for controlling the pitch of the blades 21 includes both elements carried by the hub body 20 and non-rotating elements adjacent to the rotating hub body. The elements of the control mechanism that rotate with the hub body and the coacting non-rotating elements may be constructed and arranged in various manners, but it is highly desirable to achieve compactness in the sense of minimizing the overall dimension of the mechanism in the direction of the hub axis. In other words, it is desirable to achieve close coupling between the propeller blades and the aircraft engine, and an important feature of the preferred form of my invention is that I solve various difficulties that have precluded such compactness in prior art devices. It is further desirable to have the mechanism suitably enclosed. A further feature in the preferred form of my invention is that I not only solve the problem of minimizing the axial dimension of the mechanism, but also, and simultaneously, take care of the difficulty of adequately enclosing coacting elements of a mechanism, some of which elements are rotating at high angular velocity while other of the elements adjacent thereto are non-rotative relative to the aircraft. One construction incorporating my solution to the difficulties involved in the spatial contraction and the housing of such mechanism will now be described, but it is to be borne in mind that other constructions may be employed, and, further, that my invention may be practiced without any attempt to conserve space or any attempt to house all parts of the mechanism.

Back of the blade housing 27, the hub body 20 provides a circular flange 29 embraced by an annular gear housing 30, the gear housing being anchored to the hub body, for example, by pins 31 extending from a front wall 32 of the gear housing into engagement with the hub body. The gear housing 30 is held against the hub body by a suitable nut 33 threaded on the circular flange 29, the nut and flange being, by preference, apertured to receive a retaining wire 34. The gear housing 30 has a short inner circular flange 35 and an overhanging outer flange 36 and fits with rotational clearance against a complementary housing, generally designated 37, that is non-rotatably mounted on the engine 23.

Each of the propeller blades 21 may be rotatably mounted in the corresponding blade housing 27 of the hub body in any suitable manner known to the art. In my preferred construction, the shank 28 of each of the propeller blades is embraced by a tight-fitting ferrule 40 which has an integral annular thrust shoulder 41 and is thickened to provide a tapering wall 42 at its inner end. The drawings indicate that the propeller blades are of wood and the blade mount under consideration is specifically adapted to a wooden propeller. Other types of propeller blades may be used and any suitable arrangement for mounting the blades may be employed in the practice of my invention. For anchoring the wooden shank of a propeller to the ferrule 40 in a positive manner, I may employ two tubular members 43 spanning the interior of the ferrule and for further anchorage drive an annular wedge 44 into the butt of the blade to expand the shank against the tapered wall 42.

One of the problems taken into consideration in the design of the preferred form of my invention is that of providing a seal around the shank of the propeller blade to keep lubricant from escaping outwardly in the longitudinal direction of the blade, the seal being effective against any static pressure developed in the lubricant or pressure generated by centrifugal force. A feature of the preferred form of my invention is the conception of placing the lubricant in the blade housings initially under substantial static pressure, and this feature requires exceptionally high efficiency in such a sealing means.

In the illustrative constructions suggested by the drawings, a thrust nut 47 threaded into the outer end of each of the cylindrical blade housings 27 cooperates with the thrust shoulder 41 of the ferrule 40 to retain a pair of thrust bearings 48, a washer 49 being shown between the bearings and the shoulder 41. The thrust nut 47 is cut away to house a ring 50 and one or more V-shaped sealing rings 51 of suitable packing material. Two of the sealing rings are used together in the construction shown in the drawings, and the outer face of the associated ring 50 is beveled at its edges to conform with the configuration of the innermost sealing ring and to provide a desirable tendency on the part of the ring 50 to spread the adjacent sealing ring 51. The ring 50 is preferably of substantial weight so that in operation centrifugal force causes the ring 50 to press outwardly against the sealing rings 51 and thereby causes the sealing rings to be spread into effective sealing engagement with the associated cylindrical walls. The greater the centrifugal force, the greater the outward pressure of the ring 50. To lock the thrust nut 47 against rotation, I may provide a clip 52 (Fig. 6) having a tongue 53 engaging a complementary recess 54 in the thrust nut, the clip being attached to the outer rim of the ferrule 40 by suitable screws 55. The clip may have a number of holes 56 to provide a certain degree of adjustment in position. At the inner end of each of the blade shanks is an inner thrust bearing 59 retained between a thrust ring 60 and a spacer collar 61 embracing the ferrule 40. Abutting the spacer collar 61 and keyed or otherwise secured to the ferrule 40 is a worm gear 62 which is in turn secured against axial movement by a ring 63 integral with the ferrule.

The particular bearing arrangement described is recommended over other possible constructions because, as may be understood by inspecting Fig. 2, tightening of the thrust nut 47 tends to compress the blade shank assembly, thereby stressing both the outer bearings 48 and the spaced inner bearing 59. One of the features of my invention is the concept of utilizing such an arrangement to place a substantial load on the inner bearing 59 to lend rigidity to the blade and at the same time to "pre-load" the outer bearings 48. These effects may be attained to any desirable degree simply by tightening down the thrust nut 47 in the course of assembly, the extent to which the thrust nut is tightened being within the skill of those experienced in this art. Under centrifugal action, of course, the original thrust loaded on the inner bearing 59 is at least partially removed, and the thrust on the outer bearings 48 is increased, but axial movement of the blade and bearings in response to centrifugal force is minimized.

In the application of my invention to the control of an adjustable member or members on a rotary body that rotates with the high angular velocities typical of airplane propellers, I find it advantageous to incorporate an epicyclic gear train in the control mechanism associated with the hub assembly of the propeller, and I find it further desirable to make the gear arrangement irreversible, at least under non-resonant conditions, with respect to the adjustable blades to prevent actuation or creepage of the gear system by stress transmitted therethrough from the blades. It is to be understood that such a gear system is not necessary in all practices of my invention and that it is not necessary to provide for irreversibility in the gear train to preclude creepage, as will be apparent later.

In the preferred form of my invention that includes such a gear train, irreversibility is provided in the gear connection with each of the propeller blades. In this preferred construction a worm 65 (Fig. 3), preferably of the hour-glass type, meshes with the worm gear 62 on each propeller shank, the worm being integral with a pinion shaft 66 that is journaled in a worm housing 67. The worm housing 67 that is associated with each of the propeller blades is bolted both to the hub body 20 and to the gear housing 30 by suitable cap screws 68, and is closed at its front end by a threaded plug 69. At one end of the pinion shaft 66 is a bearing 70 retained between an annular shoulder 72 in the worm housing and the inner end of the plug 69. At the other end of the pinion shaft a second bearing 73 is confined by an annular shoulder 74 in the worm housing and a pair of spacer rings 75, the spacer rings lying against a washer 76 which in turn rests against the wall 32 of the gear housing 30. Within the gear housing 30 a pinion 77 is non-rotatably mounted on the end of the pinion shaft 66 and retained by a suitable cap screw 78. A packing ring 79 seals off lubricant in the worm housing 67, being under pressure from one of the spacer rings 75. As the drawings indicate, there is a worm gear 65 and a pinion 77 for each of the two propeller blades 21.

It is to be noted particularly that the arrangement described may be constructed to confine under pressure a supply of lubricant for the blade bearings 48 and 59 and the worm bearings 70 and 73. The lubricant cannot escape outwardly from either of the blade housings 27 because of the previously described V-shaped sealing rings 51, and it is contemplated that the joints made by the worm housing 67 with the hub body 20 and the gear housing 30 will likewise be effectively sealed by any suitable expedient. The threaded plug 69 prevents escape of lubricant from the outer end of each of the worm housings, and escape of lubricant from the worm housings past the wall 32 is prevented by the packing rings 79. Preferably, each of the worm housings 67 is provided with a suitable lubrication fitting 79a through which lubricant may be introduced to any desired pressure by employing a grease gun, the fitting 79a incorporating a check valve to prevent escape of the lubricant. It will be noted that pressure from the confined lubricant will tend in a desirable manner to spread the V-shaped packing rings 51, and it is to be further noted that thermal expansion of the confined lubricant incidental to normal operation will increase the pressure against the V-shaped rings and will also prevent the lubricant pressure from dropping in response to any thermal expansion of the metal walls that confine the lubricant.

Mounted in the gear housing 30 is a movable member in the form of an outer ring gear 80 having inner teeth 81 meshing with the pinions 77 and a second movable member in the form of an inner ring gear 82 having outer teeth 83 meshing with the pinions 77. These ring gears normally move bodily with the rotation of the hub body 20 and at the same angular velocity as the hub body, but since the ring gears are rotatably mounted on the hub body for movement relative thereto, such bodily movement of the ring gears may be retarded relative to rotation of the hub body 20. It is apparent that retardation of one of the ring gears 80 and 82 relative to the rotation of the hub body 20 will actuate the pinions 77 and thereby cause the other of the two ring gears to be accelerated relative to the rotation of the hub body, and that the pinions 77 may be rotated in either rotary direction for increasing or decreasing the pitch of the propeller blades 21 by retarding the proper ring gear, the two ring gears having opposite effects on the pitch of the propeller blades.

The outer ring gear 80 may be revolvably mounted in the gear housing 30 in any suitable manner. In the construction suggested by the drawings, as best shown in Figs. 9 and 10, a groove 85, preferably V-shaped in cross-sectional configuration, is formed in the periphery of the outer ring gear to receive a plurality of circumferentially spaced complementary bearing shoes 86. The bearing shoes 86 are mounted on studs 87 that have enlarged heads 88 threaded into the flange 36 of the bearing housing, the inner ends of the studs engaging the front wall 32 of the gear housing. The studs may be locked in place by suitable pull rings 89. Preferably the periphery of the gear housing 30 is formed with arcuate bays 90 to accommodate the studs 87.

The outer ring gear 80 may, of course, be revolvably mounted in the gear housing by other means than above described. By way of example I show in Fig. 13 an outer ring gear 80a having a peripheral groove 85a shaped for engagement by a series of ball-bearing rollers 92. The rollers 92 may be mounted on studs 87a corresponding to the above described studs 87.

The inner ring gear 82 may be revolvably mounted on a ball race 93 that is confined between the inner flange 35 of the bearing housing and the previously mentioned nut 33.

My invention contemplates the provision of non-rotative means to cooperate selectively with the two ring gears 80 and 82 for retardation thereof, the retardation being effective under high speed conditions by momentary impulses of retarding force that are not severe enough nor prolonged enough to immobilize either of the ring gears. In the preferred form of my invention under consideration here, I utilize electromotive force to bring coacting braking surfaces into mutual frictional contact for the selective retardation of the ring gears, but those skilled in the art will readily appreciate the fact that the actuating force may be other than electromagnetic, for example, it may be mechanical or pneumatic, and it will be further apparent that momentary retardation forces for my purpose may be effective to retard the ring gears momentarily in the desired manner without involving actual friction, the use of electromagnetic force solely for braking action being well known.

In the preferred practice of my invention that is characterized by frictional contact between coacting surfaces in the retardation of the ring gears, such frictional contact may be made directly with the material of the ring gears, and the relative movement to permit such frictional contact when required may be provided either by making the ring gears movable axially towards and away from the cooperative non-rotating retarding means, or, on the other hand, by making the non-rotating retarding means movable towards and away from the corresponding ring gears, electromagnetic force preferably but not necessarily being employed to cause the relative movement in either case. A feature of the preferred construction of my invention shown in the drawings, however, is that neither the ring gears per se nor the corresponding non-rotating retarding means are movable relative to the other, the required frictional contact being accomplished through the medium of auxiliary means carried by the ring gears and adapted for movement towards and away from the stationary retarding means. Thus, the outer ring gear 80 carries an axially movable armature ring 95 and the inner ring gear 82 carries a corresponding armature ring 96.

The mounting means for the outer armature ring 95 may comprise a series of spaced pins 97 slidingly extending from the ring into bushings 98 in the ring gear 80. It is highly desirable that the armature ring 95 have a tendency to seek its retracted position against the face of the ring gear 80, and therefore I employ suitable resilient means to act upon the pins 97; for example, leaf springs 99 best shown in Figs. 10 and 11. Each of the springs 99 is centrally attached to the end of the corresponding pin 97 by a suitable screw 100 and is bowed or arched with its ends pressing against the face of the ring gear 80 to draw the pin towards its normal retracted position. One of the ends of the leaf spring 99 is anchored to the ring gear 80 by a screw 101, the aperture in the spring that receives the screw 101 being oversize with respect to the screw so that the anchored end as well as the free end of the spring is free to slide along the face of the ring gear when the pin moves from retracted position. In like manner and for the same purpose, the inner armature ring 96 may be supported by pins 102 slidingly mounted in the inner ring gear 82, the pins being engaged by corresponding leaf springs 103. The armature rings may be considered as part of the corresponding ring gears, in which case the ring gears may be described as axially extensile.

While my invention may be constructed in a manner that will permit the propeller blades to be rotated continuously in either direction about their respective pitch axes, I prefer to provide some form of stop means to limit the blades to predetermined pitch angles. Such stop means may be incorporated at various points in the mechanism carried by the hub body 20. In the preferred form of my invention I associate the stop means with the two ring gears 80 and 82. For this purpose the outer armature ring 95 has a stop shoulder 105 to cooperate with a stop, generally designated 106, that projects from the gear housing wall 32, the ring gear having a second stop shoulder 105a for the purpose of maintaining dynamic balance. In like manner the inner armature ring 96 has a stop shoulder 107 to coact with the stop 106 and for dynamic balance has a peripherally extending portion 108. Since freedom for more than 180° of rotation on the part of the inner ring gear is desirable, the peripheral portion 108 of the armature ring 96 is dimensioned to clear the stop 106. The stops for limiting rotation of the two ring gears may be omitted and, of course, will be omitted if the pitch of the worm 65 is so low that more than 360° rotation of a ring gear is necessary for the required range of change in propeller pitch.

The stop 106 for cooperating with the stop shoulder 105 of the outer armature ring and with the stop shoulder 107 of the inner armature ring may be of any suitable construction. A feature of the preferred form of my invention is the incorporation of novel shock-absorbing means in the construction of such a stop. In the preferred construction, best shown in Fig. 7, the stop includes a lug 110 integral with the housing wall 32. The lug 110 is apertured to slidingly embrace a suitable pin 111 having a head 112. An outer helical spring 113 and an inner helical spring 114 acting between the head 112 and the lug 110 tend to keep the pin extended from the lug in a direction to meet the stop shoulders of the armature rings, the extension of the pin under the action of the springs being limited by a cotter pin 115 or other suitable means.

That the resilient stop 106 may be replaced by other constructions is indicated by way of example in Fig. 8 showing an alternative form of the stop. In Fig. 8 the lug 110a is apertured to slidingly receive a bolt 117 that carries on its extended end a rigid disc 118 and carries on its inner end a nut 119 locked by a second nut 120. The bolt 117 is embraced by a bumper body 121 of rubber or other resilient material which takes up the force of impact whenever the extended end of the bolt is struck by one of the armature ring stop shoulders.

The fact that each of the two ring gears 80 and 82 is in dynamic balance by virtue of counterweights for their respective stop means has been mentioned. Other features pertinent to such balance may be noted. For example, as best shown in Fig. 9, the radial extent of the inner ring gear 82 is greater than that of the outer ring gear 80 to compensate for its smaller diameter, and balance it dynamically with the outer ring gear. I have found that the sensitiveness of the pitch control, as well as its stability under all operating conditions, is increased by proper correlation of the moments of inertia of these two ring gears and by appropriate adjustment of their respective weights to avoid a free period of vibration which might equal an engine-induced frequency encountered during flight and which might cause the gear train to creep. In practice, I lighten or load one or the other of the ring gears as required to overcome any tendency of the blades to creep under operating conditions, this lightening or loading taking care of any minor and unidentified factors of balance in the blade control. For example, I may reduce the mass of the outer ring gear assembly to substantially equalize the moments of inertia of the two annular gears by providing apertures 80a in the outer ring gear 80, as indicated in Fig. 4. Such drilling of holes may also be done to change the natural period of vibration of either ring gear when creeping of the worm gear is attributable to accentuated vibration.

Again, as best shown in Fig. 4, the circular gear housing 32 has a short annular rib 122 cast thereon and diametrically opposite the rib a pair of spaced bosses 123. It will be noticed that the stop 106 carried by the housing 32 is between the two bosses 123.

For final balance of the assemblage that is keyed to the shaft 22, the bosses 123 and rib 122 may be drilled as indicated by the bores 124 without penetrating or weakening the housing wall. If the housing 32 is cast from aluminum or other relatively light material, such bores 124 may be filled with plugs of lead or other heavier material where loading is required for balance.

The electromagnetic means for selectively attracting the armature rings 95 and 96 may take various forms and may be mounted in various ways within the non-rotating housing 37. In the preferred form of my invention I employ electromagnetic means of novel construction that is highly efficient for my purpose, and achieve compactness as well as simplicity of construction by incorporating the housing 37 in the construction of the electromagnetic means. The housing 37, which may be termed the "electromagnetic housing," is attached to the nose of the engine 23 by suitable cap screws 125 extending through spacer sleeves 126 and comprises two spiders 127 and 128 connected at webs by rivets 129. These spiders are preferably made of soft steel and cooperate to encase an outer electromagnetic coil 132 cooperative with the outer armature ring 95 and an inner electromagnetic coil 133 cooperative with the inner armature ring 96. It will be noted that the edges of the two spiders provide annular gaps 134 and 135, respectively, at the forward faces of the outer and inner coils, so that each coil in cross-section is encased by a U-shaped metal wall providing two poles corresponding to the poles of an electromagnet core. Preferably, the two coil casings provide annular grooves in which a split annular plate 137 may be seated, this plate covering the web sections of the two spiders and serving as a weather shield continuous with the housing wall 37.

The annular gaps 134 and 135 may be referred to as the air gaps of the two electromagnets. A feature of my invention is that these gaps are narrow relative to the radial cross-sectional dimensions of the associated coils. I have found that the concentration of magnetic flux achieved by employing relatively narrow air gaps in the manner illustrated in the drawings serves to minimize the amount of current necessary for effective operation. This feature is of utmost importance in the operation of the preferred form of my invention, since I contemplate energizing the electromagnets by impulses of current generated by repeated opening and closing of electric circuits. The relatively heavy current required for the operation of electromagnets of the types heretofore employed for such purpose would necessarily cause arcing at the switch contacts of the control circuit, and such arcing repeated frequently would soon make any control system unreliable if not inoperative. The current employed in my system may be so light by virtue of the highly efficient construction of the electromagnets that the control circuit may be opened and closed for delivering any number of closely successive impulses of current to the coils without any trouble whatsoever with the switch contacts.

Electricity for the energization of the two electromagnetic coils is supplied by a cable 140. A receptacle 141 is attached to the electromagnet housing 37 by rivets 142 and preferably covers the adjacent ends of the split annular plate 137. The receptacle receives a plug 143 at the end of the cable 140 and the drawings show a pair of wires 144 and 145 passing from the receptacle through the housing wall 37 to the outer coil 132, and a second pair of wires 146 and 147 passing in like manner to the inner coil 133. The number of wires may be reduced in practice by grounding circuits.

The rotary hub assembly that includes the hub body 20 and the gear housing 30, the pinions 77, the outer ring gear 80 and the inner ring gear 82, revolves clockwise with the engine shaft 22, as indicated by the arrow 150 in Fig. 4. Energization of the outer electromagnetic coil 132 while the hub assembly is rotating will attract the outer armature ring 95 into frictional contact with the metal face of the electromagnet resulting in a braking action that retards the rotation of the outer ring gear 80. Such retardation of the outer ring gear causes the outer ring gear to rotate counter-clockwise relative to the hub assembly, as indicated by the arrow 151 in Fig. 4, and to rotate each of the pinions 77 counter-clockwise, as indicated by the arrow 152, counter-clockwise rotation of the pinions acting through the corresponding worms 65 to cause the two propeller blades 21 to rotate about their longitudinal axes in the direction of decreasing pitch. In the same manner, energization of the inner coil 133 attracting the inner armature ring 96 causes braking action to retard the inner ring gear 82, while retardation rotates the pinions 77 in clockwise direction, thereby increasing the pitch of the propeller blades.

Centrifugal force acting on a conventional propeller blade exerts a tremendous force tending to twist the blade into alignment with its plane of rotation. The worm arrangement described is nearly irreversible and may normally serve as a lock against such rotation, but if the centrifugal torque is excessive, it may tend to cause the gear train to rotate towards negative pitch and bring the outer stop shoulder 105 against the stop 106 with damaging force. This effect is accentuated when the engine vibration is at the natural frequency of the propeller assembly. Even if the retardation friction is light, any appreciable prolongation of the outer coil energization favors such destructive racing, so that control of the coil circuit by conventional manually operable switches is dangerous. It is to be borne in mind that in a control system of the general type under consideration, any severe or prolonged retardation effect is multiplied by the relatively high speed of propeller shaft rotation.

As heretofore mentioned, one of the features of my invention is the conception that any danger of causing too drastic retardation of the ring gears may be avoided by incorporating in the control system means for preventing prolonged energization of the coil circuits. In other words, I propose to limit the coil energization automatically to current impulses of predetermined momentary duration, the strength and duration of the momentary impulses being correlated to provide desirably smooth action on the part of the control mechanism, and yet to achieve pitch changes with required rapidity.

Any switch construction limited inherently to circuit-closing periods of momentary duration may be employed in the practice of the invention.

In the preferred form of my control system, I may, for example, and preferably do, incorporate the mechanism shown in Figs. 15 to 17, which switch mechanism is disclosed and claimed in the copending application entitled "Impulse switch," Patent No. 2,278,918, issued April 7, 1942, by Chester L. Davidson and assigned to the present assignee.

The instrument generally designated 153, shown in Figs. 15 to 17 as mounted on the airplane panel 154 by screws 155, has a cylindrical housing 156 and includes a cut-out switch 157, a switch 158 to determine the direction in change of pitch, an impulse switch button 159, and a replaceable fuse 160. Both the cut-out switch 157 and the pitch-determining switch 158 are of conventional types, the cut-out switch being employed to cut off the whole system, and the pitch-determining switch being employed to direct the current impulse to one of the electromagnetic coils or the other.

Mounted on an inner frame 161 within the instrument housing 156 is a switch 162 of the type known to the art as a "micro switch" and characterized by extremely rapid operation. For example, the micro switch may be adjusted to close a circuit when a plunger 163 is depressed to a given point and to open when the plunger is allowed to return .001 inch toward its normal position. To provide the required momentary closing of the switch 162, I propose to employ a mechanism the movement of which is initiated manually but which, after such manual initiation, proceeds automatically to depress the plunger 163 for a predetermined moment.

Such an actuating mechanism may comprise a pneumatic cylinder 165 containing a hollow piston 166 having a stem 167 carrying the switch button 159. The stem 167 has an axial bore 168 and a radial bore 169 providing for passage of air into and out of the pneumatic cylinder, an adjustable needle valve 170 being provided to control the rate of air flow. The hollow piston 166 is urged toward its leftward position by a helical spring 171 that seats against a metal bushing 172, the bushing in turn seating against an internal bead 173 formed in the wall of the cylinder 165. At the inner end of the pneumatic cylinder 165 is a hollow floating piston 175, the rightward movement of which is limited by a flange 176 at the inner end of the pneumatic cylinder. The rear wall 177 of the floating piston has an aperture 178 into which extends the end of an operating lever 179, the end of the lever being bent to form a hook 180 disposed to be engaged by the rear wall 177 of the floating piston. The operating lever 179 is journalled in ears 182 provided by the inner frame 161 and is disposed in a position to move against the plunger 163 when its hooked end 180 is moved leftward by the floating piston.

The control mechanism of Figs. 15 to 17 is operated by manually depressing and then releasing the impulse button 159. Depression of the button 159 forces air from the interior of the pneumatic piston outward through the stem of the piston 166. The subsequent release of the push button permits the spring 171 to return the piston 166 before a volume of air equivalent to that discharged can return through the piston stem. The result is a momentary rarefaction of air in the pneumatic cylinder as the piston 166 approaches its normal leftward position, and this rarefaction permits atmospheric pressure to force the floating piston 175 momentarily inward, the extent and duration of the inward movement of the floating piston being governed by the adjustment of the needle valve 170. The inward movement of the floating piston 175 draws the operating lever 179 against the plunger 163 of the micro switch. Restoration of pressure in the pneumatic cylinder permits a spring (not shown) in the micro switch associated with the plunger 163 to return the plunger, operating lever, and floating piston to their normal positions, as shown in Fig. 16.

The wires required for the control circuits are led to the control panel by a cable 184 terminating in a suitable fitting 185 on the control housing 156. The wiring diagram required for control by the panel instrument described is shown in Fig. 18. A previously-mentioned wire 145 from the outer electromagnet coil 132 and a previously-mentioned wire 147 from the inner electromagnet coil 133 are connected respectively to the alternate poles of the pitch-determining switch 158. The third terminal of the switch 158 is connected by a wire 186 with one terminal of the master or cut-out switch 157. The other terminal of the cut-out switch 157 is connected by a wire 187 with a terminal of the micro switch 162. A wire 188 connects the other terminal of the micro switch 162 with one pole of a battery 189, the other pole of the battery being connected by a wire 190 with the second wires 144 and 146 of the outer and inner electromagnet coils, respectively.

To operate the control, the pilot closes the cut-out switch 157 and moves the switch 158 to connect with the required electromagnet coil. The operator then depresses and releases the button 159, causing a momentary impulse of current to be sent to the indicated electromagnet coil. The result is an instantaneous attraction and release of the corresponding armature, the contact between the armature and the face of the electromagnet being so brief that the associated ring gear is retarded but very slightly. The armature springs are important in determining the momentary action required since they tend to hold the armatures retracted until substantial magnetic flux is built up and to withdraw the armatures when the magnetic flux begins to wane. By watching a tachometer that records the engine speed, the operator can ascertain the effect of each impulse and ascertain when the pitch has been changed sufficiently to result in the desired engine speed. If relatively soft steel is employed for the armatures and the faces of the electromagnets, desirably polished contacting surfaces develop in the operation of my device, and a certain lubricating effect is provided by the production of a fine metal powder magnetized to the friction surfaces. The smooth non-gripping character of the braking surfaces is important along with the impulse character of the brake energization. By virtue of these two factors, my arrangement with a suitably high gear ratio will permit efficient and safe variable pitch control of the propellers, regardless of extremely unbalanced moments acting on the propeller blades.

Control of the propeller pitch may be provided by other circuit arrangements for energizing the electromagnet coils with impulses of current. By way of example, I show an alternative arrangement in Fig. 18 in parallel with the micro switch 162 and the cut-out switch 157. The alternate circuit includes a manual switch 191 and a mechanically-operated impulse switch 192. The circuit is completed by a wire 191a connecting the manual switch 191 with the wire 188 in the main circuit, a wire 191b between the manual switch 191 and the impulse switch 192, and finally a wire 191c connecting the impulse switch with the third pole of the pitch-determining switch 158.

The impulse switch 192 is mechanically controlled by mechanism in a housing 193 driven by a motor 193a. The mechanism in the housing 193 is adapted to intermittently close the switch 192 for a brief moment, the closing moments being spaced at appreciable time intervals to permit the armatures associated with the two electromagnets to be completely retracted to their normal positions by their respective springs. If the motor 193a is in continuous operation and the pitch-determining switch 158 connected with the desired coil, the operator may change the pitch by manually closing the switch 191 to permit the impulse switch 192 to deliver periodic impulses of current to the indicated electromagnet coil. The impulses will be delivered at automatically timed intervals and will be of sufficient duration to be effective but not of such extensive duration as to endanger the mechanism. It is contemplated that the change in pitch achieved by the operation of the impulse switch 192 will be sufficiently slow to permit the operator to operate the manual switch 191 without "overshooting" a desired adjustment. If the cut-out switch 157 is closed, it is apparent that the operator has the choice either of using the single impulse switch 162 or of using the manual switch 191 to cause the switch 193 to deliver a series of impulses to the electromagnet.

My description to this point emphasizes the adaptability of my hub construction and electromagnetic arrangement to pitch-control, in general, without regard to propeller blade design. An important feature of my invention, however, is that certain valuable advantages may be realized by at least approximately balancing certain factors in the construction described.

In the first place, with respect to each of the blades, I propose to approach a balance between the centrifugal moment that tends to twist the blade into its plane of rotation and the contrary aerodynamic moment. An approximate balance between these two moments minimizes the tendency of the blade to move the pitch-control mechanism in either direction and results in the blade being sensitive to control forces of low magnitude. I have found that, by employing in my combination balanced blades, polished retarding surfaces, and low energizing currents, I may safely resort to other types of manual control switches. For example, I may safely employ the simple circuits shown in the wiring diagram of Fig. 19, and use for a control current only half an ampere of current at 12 volts or, at a maximum, one ampere. Without such balance, a current of 20 to 30 amperes is sometimes required.

In Fig. 19, one pole of the battery 194 is connected by a wire 195 with leads 144 and 147 from the outer and inner electromagnet coils, respectively, the other pole of the battery being connected by wires 196 and 197 with separate pitch-control switches 198 and 199, respectively, the switch 198 being connected to the wire 146 from the inner electromagnet coil and the switch 199 being connected to the wire 145 from the outer electromagnet coil. Manual closing of the switch 198 will change the pitch of the propeller blades in one direction and manual closing of the switch 199 will change the pitch of the blades in the other direction. Each switch may be manually closed for only an instant at a time to create one or more impulses which can be used for control purposes. However, any prolonged energization of either electromagnet coil will not be dangerous because, in the first place, relatively slight pressure is employed, induced by low energizing current acting against the yielding means of the armatures; in the second place, highly polished surfaces are employed; and, in the third place, there is no excessive blade moment, either centrifugal or aerodynamic.

While my invention is distinguished by the fact that the control arrangement of Fig. 19 may be employed, it is also to be noted that additional advantages may be had by employing balanced propeller blades in combination with the control circuits of Fig. 18. In this latter combination, the absence of any overwhelming moments in the blades results in the predetermined current impulses having substantially constant control effects in both directions. Thus, for example, if I employ a balanced propeller blade, I may adjust the needle valve 170 of the pneumatic control to produce a change of approximately 5 R. P. M. or less in the speed of the engine for each current impulse. Such an arrangement simplifies the task of a pilot seeking to maintain a given engine speed. By glancing at his tachometer, he may readily estimate how many impulses will be required to bring the engine speed to normal.

The art is already familiar with the expedient for counterbalancing a blade that consists in adding a counterbalancing protuberance to the blade or blade shank. Fig. 20, for example, shows a blade having a shank 203 that is adjustably embraced by a split collar 204. Extending radially from the collar 204 is a counterbalance body 205 that has an axial bore 206 and an internal groove 207. A weight 208 is slidingly mounted in the bore 206 and prevented from rotation by sliding engagement with the groove 207. The weight 208 is engaged by a screw 209, one end of the screw being journalled in the outer end of the bore 206 and the other end of the screw being journalled in an inner bushing 210. Integral with the screw 209 is a screw gear 211 that is controlled and locked by a manually adjustable worm 212. The angular disposition of the counterweight body 205 with respect to the blade and its center of gravity may be adjusted to achieve a balance, or approximate balance, of the moments affecting the blade under given operating conditions. Other expedients can be used for balancing the blade but, regardless of the expedient used, I prefer to balance the blade for a normal flight condition, first, because such balancing minimizes the predominance of either moment under extreme conditions, and, second, because most pitch changes are made at or near such normal flight conditions.

In the description of my invention to this point, I have described considerations given to various factors for the purpose of minimizing the tendency of the gear train on the hub assembly to creep under various operating conditions. While all of these expedients are desirable and contribute to the end sought, I need not give such consideration to these factors since my invention includes the further concept of automatic means to positively lock the pitch-controlling gear train against creepage. How such means may be incorporated in my construction may be understood by referring to Figs. 9 to 11.

Mounted on the housing wall 32 by suitable means, such as screws 220 and a dowel 221, is a latch or locking member 222 to control the rotation of the outer ring gear 80 and thereby to control movement of the gear train. In the particular construction shown, the outer ring gear 80 is controlled through the medium of the associated armature ring 95, a feature of my invention being that the electromagnetically-actuated movement of the armature ring may be relied upon to provide the desired automatic operation of the latching arrangement. To this end, the forward face of the outer armature ring 95 may be formed with a continuous series of latch teeth 223 to cooperate with complementary latch teeth 224 presented by the latching member 222. The latch teeth 223 and 224 in this arrangement are matched to operate in the manner of a detent, which detent, when effective, precludes retardation of the outer ring gear 80 relative to rotation of the hub assembly and yet permits rotation of the outer ring gear in the opposite direction relative to the hub assembly, i. e., permits acceleration of the outer ring gear resulting from retardation of the inner ring gear 82. The drawings show a second latch member 225 similar to the first latch member 222 and, in like manner, mounted on the housing wall 32 by screws 226 and a dowel 227. This second latch member 225 presents teeth 228 to cooperate with a continuous series of complementary teeth 229 on the face of the inner armature ring 96, the teeth 228 and 229 being designed to cooperate to prevent retardation of the inner armature ring 96 without preventing acceleration thereof relative to rotation of the hub assembly.

The manner in which the latching arrangement operates may be readily understood from the description. Normally, i. e., when no pitch changes are being effected, the latch member 222 cooperates with the outer armature ring 95 to prevent movement of the gear train in one direction, and the latch member 225 simultaneously cooperates with the inner armature ring 96 to prevent movement of the gear train in the opposite direction, the gear train thus being held immobile relative to the rotating hub assembly. In some installations of my control mechanisms, the tendency for the gear train to creep will, under all normal circumstances, be in only one direction, in which case one of the latch members 222 and 225 may be omitted, the latch member that is retained being the one that opposes the tendency to creep in the prevailing direction.

It is noteworthy that the latching arrangement described requires no additional actuating mechanism and yet is correctly correlated with the means that actuates the gear train. Other latching devices may be employed and may be interlocked with the retarding means in other ways in various practices of my invention.

This application is a continuation-in-part of my application Serial No. 57,739, filed January 6, 1936, which application has been abandoned in favor of my continuation application Serial No. 286,940, filed July 27, 1939. The said prior disclosure provides a basis for the general design of the gearing disclosed herein, the braking arrangement including the stationary electromagnets and the spring-biased armatures, and the concept of energizing the electromagnets with momentary impulses of current.

The preferred form of my invention in one of its fields of application has been described herein in specific detail for the purpose of disclosure and to illustrate the principles involved. My description will suggest to those skilled in the various arts a wide range of changes, modifications, and substitutions that do not depart from the essence of my concept, and I reserve the right to all such changes, modifications, and substitutions that come within the scope of my appended claims.

I claim as my invention:

1. Means for governing during the rotation of a rotary member the position of a member adjustably mounted thereon, said means including: a first means mounted on said rotary member to move bodily therewith, said first means being movable relative to said rotary member whereby such bodily movement of the first means may be retarded relative to rotation of the rotary member; means operatively connecting said first means with said adjustable member whereby movement of the first means relative to said rotary member will change the adjustment of said adjustable member; a first braking means in the form of an armature presenting a first braking surface; a second braking means in the form of an electromagnet clad with magnetic metal formed to present a second braking surface cooperative with said first braking surface, said magnetic metal being formed with a gap dividing said second braking surface, one of said braking means being operatively connected with said first means, the other of said braking means being mounted in a non-rotative manner near said rotary member, at least one of said braking means being movable relative to the other for braking action in response to energization of said electromagnet; and means to energize said electromagnet with impulses of current of momentary duration, the strength and duration of the impulses being correlated to retard said bodily movement of said first means by momentary slapping contact between said braking surfaces.

2. Means for governing during the rotation of a rotary member the position of a member adjustably mounted thereon, said means including: a first means mounted on said rotary member to move bodily therewith and being movable relative thereto whereby said bodily movement may be retarded relative to rotation of the rotary member, said first means being operatively connected to said adjustable member for adjustment of the adjustable member in a given direction by such retardation, said first means including a first rotary brake member; a second means mounted on said rotary member to move bodily therewith and being movable relative thereto whereby its bodily movement may be retarded relative to rotation of the rotary member, said second means being operatively connected to said adjustable member for adjustment of the adjustable member opposite to said given direction by such retardation, said second means including a second rotary brake member; a first non-rotative brake member comprising an electromagnet adjacent said rotary member and contactable with said first rotary brake member, at least one of said first brake members being movable relative to the other for frictional contact therewith to retard said bodily movement of said first means; a second non-rotative brake member comprising an electromagnet adjacent said rotary member and contactable with said second rotary brake member, at least one of said second brake members being movable relative to the other for frictional contact therewith to retard said bodily movement of said second means; and means limited to momentary actuation to cause relative movement with a momentary slapping action either between said first brake members to retard said first means without immobilization of the first means or between said second brake members to retard said second means without immobilization of the second means, whereby adjustment of said adjustable member is limited to relatively small increments produced by said momentary slapping action.

3. A combination as set forth in claim 2 in which yielding means is provided to oppose but not prevent said relative movements between brake members, thereby to minimize the duration of the frictional contact involved in said momentary slapping action.

4. Means for governing during the rotation of a rotary member the position of a member adjustably mounted thereon, said means including: a first means mounted on said rotary member to move bodily therewith, said first means being movable relative to said rotary member whereby such bodily movement of the first means may be retarded relative to rotation of the rotary member; means operatively connecting said first means with said adjustable member whereby movement of the first means relative to said rotary member will change the adjustment of said adjustable member; a first braking means in the form of an armature presenting a first braking surface; a second braking means in the form of an electromagnet clad with magnetic metal formed to present a second braking surface cooperative with said first braking surface, one of said braking means being operatively connected with said first means, the other of said braking means being mounted in a non-rotative manner near said rotary member, at least one of said braking means being movable relative to the other for braking action in response to energization of said electromagnet; means to energize said electromagnet, said energization means being limited to the delivery of impulses of current of momentary duration to cause momentary slapping contact between said braking means; and yielding means opposing the relative movement of said braking means against each other to shorten the duration of each slapping contact relative to the duration of the corresponding impulse of current.

5. Means for governing during the rotation of a rotary member the position of a member adjustably mounted thereon, said means including: a first means mounted on said rotary member to move bodily therewith, said first means being movable relative to said rotary member whereby such bodily movement of the first means may be retarded relative to rotation of the rotary member; means operatively connecting said first means with said adjustable member whereby movement of the first means relative to said rotary member will change the adjustment of said adjustable member; a first braking means in the form of an armature presenting a first braking surface, said first braking means and said first braking surface each being of annular configuration and concentric to said rotary member; a second braking means in the form of an electromagnet clad with magnetic metal formed to present a second braking surface cooperative with said first braking surface, said magnetic metal being formed with a gap dividing said second braking surface, said second braking means and said second braking surface being of annular configuration and concentric to said rotary member, said gap being of annular configuration and substantially less in radial width than the metal of said second braking surface, one of said braking means being operatively connected with said first means, the other of said braking means being mounted in a non-rotative manner near said rotary member, at least one of said braking means being movable relative to the other for braking action in response to energization of said electromagnet; and means to energize said electromagnet with impulses of current of momentary duration, the strength and duration of the impulses being correlated to retard said bodily movement of said first means by momentary slapping contact between said braking surfaces.

6. In combination with an adjustable pitch propeller including a rotatable hub and a blade pivoted relative to said hub: a first means mounted on said hub to move bodily therewith, said first means being movable relative to said hub whereby such bodily movement of the first means may be retarded relative to rotation of the hub; means operatively connecting said first means with said blade whereby movement of the first means relative to said hub will change the adjustment of the blade; a first braking means including an armature and providing a first braking surface; a second braking means including an electromagnet and presenting a second braking surface cooperative with said first braking surface, said two braking surfaces being constituted of mild steel to produce under mutual friction a magnetic powder adhering magnetically to the surfaces and providing lubrication for the surfaces, one of said braking means being operatively connected with said first means, the other of said braking means being mounted in a non-rotative manner near said hub, at least one of said braking means being movable relative to the other for braking action in response to energization of said electromagnet; and means to energize said electromagnet to retard said bodily movement of said first means by friction between said braking surfaces.

7. Means for governing during the rotation of a rotary member the position of a member adjustably mounted thereon, said means including: a first means mounted on said rotary member to move bodily therewith and being movable relative thereto whereby said bodily movement may be retarded relative to rotation of the rotary member, said first means being operatively connected to said adjustable member for adjustment of the adjustable member in a given direction by such retardation, said first means including a first rotary brake member; a second means mounted on said rotary member to move bodily therewith and being movable relative thereto whereby its bodily movement may be retarded relative to rotation of the rotary member, said second means being operatively connected to said adjustable member for adjustment of the adjustable member opposite to said given direction by such retardation, said second means including a second rotary brake member; a first non-rotative brake member adjacent said rotary member to cooperate with said first rotary brake member to form a first pair of brake members, at least one of said first brake members being movable relative to the other for frictional contact therewith to retard said bodily movement of said first means; a second non-rotative brake member adjacent said rotary member for cooperation with said second rotary brake member to form a second pair of brake members, at least one of said second brake members being movable relative to the other for frictional contact therewith to retard said bodily movement of said second means; an electromagnet incorporated in one brake member in each of said pairs of cooperating brake members to attract the other brake member of the pair; control means; means responsive to said control means to automatically send a plurality of successive momentary impulses of current through said electromagnets selectively to cause momentary slapping action either between said first brake members to retard said first means without immobilization of the first means or between said second brake members to retard said second means without immobilization of the second means; and yielding means adapted to oppose but not prevent said momentary slapping action whereby the duration of frictional contact caused by energization of one of said electromagnets will be less than the duration of said impulses of current.

8. Means for governing during the rotation of a rotary member the position of a member adjustably mounted thereon, said means including: a first means mounted on said rotary member to move bodily therewith and being movable relative thereto whereby said bodily movement may be retarded relative to rotation of the rotary member, said first means being operatively connected to said adjustable member for adjustment of the adjustable member in a given direction by such retardation; a second means mounted on said rotary member to move bodily therewith and being movable relative thereto whereby its bodily movement may be retarded relative to rotation of the rotary member, said second means being operatively connected to said adjustable member for adjustment of the adjustable member opposite to said given direction by such retardation; control means operative for retarding said first means and second means selectively; a detent means carried by said rotary member to prevent adjustment of said adjustable member in the direction afforded by retardation of said first means, said detent means being normally effective and being adapted to become ineffective in response to operation of said control means for retarding said first means; and a detent means carried by said rotary member to prevent adjustment of said adjustable member in the direction afforded by retardation of said second means, said second mentioned detent means being normally effective and being adapted to become ineffective in response to operation of said control means for retardation of said second means.

9. In an adjustable pitch propeller adapted to be coupled with the shaft of an engine, the combination of: a rotatable structure including a hub; a blade extending outward from said hub; means for pivotally securing said blade to said hub to turn about an axis of said blade; an outer gear comprising an internally-toothed gear ring concentric with the rotational axis of said hub; bearing means for journalling said outer gear for rotation about said rotational axis of said hub; an inner gear externally-toothed and concentric with the axis of rotation of said hub; bearing means for journalling said inner gear for rotation about said rotational axis of said hub; a pinion meshing with both said inner and outer gears; a pinion shaft carrying said pinion; means for journalling said pinion shaft relative to said rotatable structure to rotate about its own axis at a position spaced from the axis of rotation of said hub; means operatively connecting said pinion shaft to said propeller blade to turn same in proportion to the angular movement of said pinion; an annular armature for each of said gears; means for respectively mounting said armatures relative to said gears and including resilient means for biasing said armatures toward their respective gears; a braking ring disposed adjacent each armature but spaced very slightly therefrom when said resilient means retract said armatures but being contactable by said armatures in an annular zone of contact upon overcoming of the biasing force; and means for momentarily slapping either armature against its braking ring and for quickly releasing it thereby imparting a momentary retarding force to the gear associated therewith without stopping thereof, said means including an annular electromagnetic means associated respectively with each braking ring and means for momentarily and selectively energizing said electromagnetic means for a period of time insufficient to stop the corresponding armature and gear but sufficient to momentarily decelerate this gear with respect to the rotatable structure through a momentary slapping contact between the corresponding armature and braking ring, this momentary retardation being sufficient to slightly change the pitch of the propeller.

10. In an adjustable pitch propeller including pivoted blade means, an armature normally rotating with said propeller and gear means for turning said blade in proportion to a relative rotation between said armature and said propeller, the combination of: an electromagnetic means adjacent said armature; resilient means for resiliently mounting said armature to permit resilient movement thereof toward and into braking contact with said electromagnetic means when said electromagnetic means is energized, thus creating a retarding force on said armature to slow this armature with respect to said propeller; and means for energizing said electromagnetic means to move said armature against the action of said resilient mounting means and into brief slapping relationship with said electromagnetic means to change the pitch of said blade means, said means deenergizing said electromagnetic means before stopping of said armature can take place, said yielding means being biased to urge said armature away from said electromagnetic means to delay contact of the armature with the electromagnetic means when the electromagnetic means is energized, and thereby cause the periods of contact to be substantially shorter than the periods of electromagnetic energization.

11. In an adjustable pitch propeller including pivoted blade means, the combination of: gear means normally rotating with said propeller; means for operatively connecting said gear means to said blade means in such manner that retardation of said gear means with respect to said propeller will change the pitch of said blade means; an annular electromagnetic element including a winding; circuit means electrically connected to said winding; means for energizing said winding at intervals; and means for applying a retarding force to said gear means for a shorter period of time than the period of time during which said electromagnetic element is energized, said means including an armature operatively connected to said gear means, and spring means resiliently holding said armature away from said annular electromagnetic element but exerting a resilient force which is overcome by energization of said electromagnetic element and corresponding attraction of said armature to retard said armature by light frictional contact with said electromagnetic element, the first portion of the period of energization of the electromagnetic element being used up in an advancing movement of the armature toward said electromagnetic element in opposition to said spring means so that short periods of retardation can be obtained with longer periods of energization of said electromagnetic element.

12. In an adjustable pitch propeller adapted to be driven by an engine and including pivoted blade means, the combination of: a magnet housing adapted to be secured to said engine at a position between the engine and said propeller, said magnet housing including inner and outer electromagnetic elements; gear means rotatable with said propeller and operatively connected to said blade means to change the pitch thereof; inner and outer ring gears operatively connected to said gear means and normally rotating with said propeller; inner and outer armatures respectively adjacent said inner and outer electromagnetic elements; means for securing said armatures respectively to said inner and outer ring gears, said means including spring means normally retracting said armatures from contact with said electromagnetic elements whereby during normal rotation of said propeller said armatures are spaced from said electromagnetic elements; and means for selectively energizing said electromagnetic elements to draw said armatures into frictional engagement therewith to retard selectively the rotation of said armatures with respect to said propeller without immobilization of same.

13. In an adjustable pitch propeller of the character described, the combination with a rotary hub assembly carrying at least one adjustable blade of means to adjust said blade while said hub assembly is rotating, said adjusting means including: gearing on said hub assembly operatively connected with said blade for controlling the adjustment of the blade, said gearing including inner and outer ring gears; means to retard said two ring gears selectively to cause adjustment of said blade in opposite directions; stop means fixedly carried by said hub assembly for contact with said gearing to block movement of the gearing at a limit position of the blade; and yielding means effective between said stop means and the gearing to cushion the limiting contact therebetween.

14. A combination as defined in claim 10, in which said means for energizing said electromagnetic means includes a make-and-break switch means in circuit with said electromagnetic means, and a drive means operatively connected to said switch means to repeatedly close and open said switch means to establish a series of electrical impulses delivered to said electromagnetic means to produce said periods of electromagnetic energization.

15. A combination as defined in claim 10, in which said adjustable pitch propeller includes a second armature normally rotating with said propeller and connected to said gear means, and which combination includes a second electromagnetic means adjacent said second armature, a second resilient means for resiliently mounting said second armature to permit resilient movement thereof toward and into braking contact with said second electromagnetic means when said second electromagnetic means is energized, thus creating a retarding force on said second armature to slow this armature with respect to said propeller to turn said pivoted blade means in a direction opposite to that effected by retarding the other armature, said second resilient means urging said second armature away from said second electromagnetic means to delay contact therebetween when said second electromagnetic means is energized, said energizing means including a make-and-break switch means, drive means operatively connected to said switch means to repeatedly close and open said switch means to establish a series of electrical impulses, and a selector switch for selectively connecting said make-and-break switch means in circuit with the two electromagnetic means to selectively deliver said electrical impulses thereto.

16. A combination as defined in claim 10, including a locking member engageable by said armature when said resilient means draws said armature away from said electromagnetic means to prevent relative rotation between said armature and said propeller in at least one direction of such relative rotation, said locking member disengaging said armature upon attraction of said armature to said electromagnetic means to permit relative rotation of said armature with respect to said propeller.

ALBERT K. McLEOD.